(12) United States Patent
Wohr et al.

(10) Patent No.: US 6,294,278 B1
(45) Date of Patent: Sep. 25, 2001

(54) COMBINATION OF LOW AND HIGH TEMPERATURE FUEL CELL DEVICE

(75) Inventors: Martin Wohr, Gross-Gerau; Lothar Matejcek, Mommenheim, both of (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/458,746

(22) Filed: Dec. 10, 1999

(30) Foreign Application Priority Data

Dec. 12, 1998 (DE) .................................. 198 57 398

(51) Int. Cl.$^7$ ...................................... H01M 8/04
(52) U.S. Cl. .................. 429/24; 429/12; 429/13; 429/22; 429/26; 429/17
(58) Field of Search ................................ 429/12, 13, 17, 429/22, 24, 26

(56) References Cited

U.S. PATENT DOCUMENTS 3,905,884 * 9/1975 Parenti, Jr. et al. ................ 204/129

* cited by examiner

*Primary Examiner*—Gabrielle Brouillette
*Assistant Examiner*—Angela J. Martin
(74) *Attorney, Agent, or Firm*—Cary W. Brooks

(57) ABSTRACT

A fuel cell system having two fuel cell stacks with different operating temperatures, i.e. a low temperature stack (LT stack) and a high temperature stack (HT stack). The high temperature stack is connected in front of the low temperature stack with respect to the process flow of fuel through the fuel cell system.

8 Claims, 1 Drawing Sheet

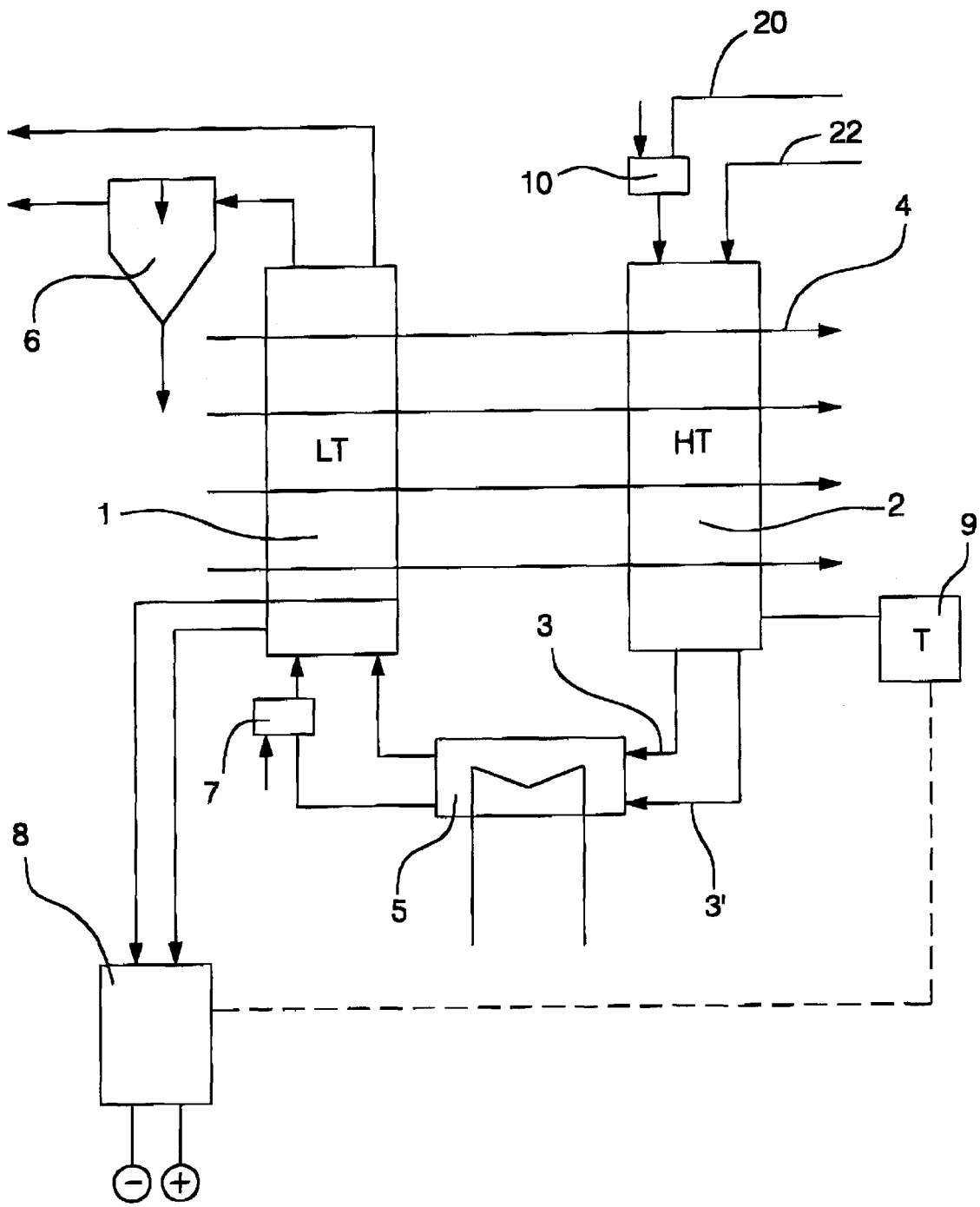

COMBINATION OF LOW AND HIGH TEMPERATURE FUEL CELL DEVICE

TECHNICAL FIELD

The invention relates to a fuel cell system, especially for vehicles driven by electric motors.

BACKGROUND OF THE INVENTION

Various types of fuel cells can be distinguished on the basis of the type of electrolyte employed. For the mobile field of application, i.e. for the generation of electric power for vehicles driven by electric motors, fuel cells with proton-conducting membranes have proven effective, whose operating temperature typically lies in the range of 60–80° C. To be sure membranes with fuel cells have already been devised which operate stably both at room temperature (EP 0 827 228 A1) and also at temperatures between 100 and 200° C. Such a membrane is described in U.S. Pat. No. 5,716,727.

Presently vehicles using fuel cells have fuel cell systems with a power of about 20 to 50 kW. The decisive handicap is presently the fact that too long a time passes after the vehicle starts operating until a stack reaches its operating temperature where it can produce full power. This problem becomes greater when fuel cells with higher operating temperatures are used. In other words, it is expected that the time delay for these fuel cells would be even greater.

Another problem to be considered is the fact that, for example, in the operation of oxide ceramic fuel cells (SOFC: Solid Oxide Fuel Cells), as is described in DE 196 11 591 A1, the temperature spread, i.e. the difference between the gas exit temperature and the gas intake temperature must not become too great since otherwise the material of the fuel cell would be very strongly loaded and inhomogeneous reaction distributions occur. It is therefore necessary to bring the process gas as well as the cooling gases or the cooling air up to approximately operating temperature before they enter the stack. DE 196 11 591 A1 therefore proposes that two oxide ceramic fuel cells of somewhat different types (one having a metallic and the other a ceramic bipolar plate) be connected in series, such that the process gases and the cooling air first enter the fuel cell with the lower (800° C.) and then the fuel cell with the higher operating temperature (1000° C.)

SUMMARY OF THE INVENTION

A fuel cell system having two fuel cell stacks with different operating temperatures, i.e. a low temperature stack (LT stack) and a high temperature stack (HT stack), the high temperature stack being connected in front of the low temperature stack for process engineering reasons.

Thus, the invention is intended to solve the problem of a current generation system based on a fuel cell which reaches its operating temperature relatively quickly and makes the highest power possible available already during the warm-up phase. In addition, the duration of the warm-up phase should be as short as possible. This is to be achieved with the lowest possible temperature spread.

This means that the process gases, generally hydrogen as a fuel at the anode and oxygen as the oxidizing agent at the cathode, are first supplied to the HT stack, at which time the hydrogen and oxygen components remaining after the chemical reaction in the HT stack are guided through a conduit system to the intake side of the LT stack. The coolant, on the other hand, flows in a cycle initially to the LT stack and then the HT stack. This means that the waste heat of the LT stack is utilized to warm up the HT stack. At this point it should be stated that normally the term "stack" refers to a compact structure of several membrane-electrode units and bipolar plates which are held together by two end plates. In this application, however, the term "stack" will also refer to units which are made up of several stacks.

This arrangement has the result that when a cold system is started up, i.e. a system which is at ambient temperature, the fuel and the process air initially scarcely react chemically at the electrodes because of the low temperature in the HT stack. This is especially due to the fact that the membrane displays only low ion conductivity at low temperature. The fuel and the process air pass into the LP stack almost unconsumed where they undergo a partial chemical reaction and form reaction heat. The thermal energy thus obtained is used initially for heating up the LT stack and is subsequently passed to the HT stack with a coolant whose rapid warm-up is thus assured. The rising temperature in the HT stack causes the chemical reactions there to be initiated, and this stack contributes to generating electrical power.

The operating temperatures of the LT stack are typically below 100° C., therefore about 60–80° C. and those of the HT stack are over 100° C., preferably 150° C., with the practical upper limit amounting to ca. 200° C.

However, it would also be conceivable to shift the temperature scale as a whole, i.e. to operate the LT stack at ambient temperature and to provide a temperature of about 60–80° C. in the HT stack. However, in both cases it is decisive that the temperature in the HT stack be brought up to the operating point more rapidly with the aid of the heat generated in the LT stack so that the power generated by the HT stack is available more rapidly, and that sufficient electrical energy is generated in the LT stack already during the warm-up phase.

In order to be able to take heat out of the process, e.g. for operating a reformer and in order to intervene in the internal feedback between the stacks, it has been proposed that a cooler for both fuel and also for the process air be introduced between the HT stack and the LT stack. This has the advantage, in particular, that the exhaust gases from the HT stack can be brought to the operating temperature of the LT stack so that the temperature spread for this stack remains as small as possible. The heat taken off from the cooler may also be used to warm up the fuel and process air before entering the HT stack and also to achieve the smallest possible temperature spread for this stack. In addition, a mixture of fresh air may be made at the entrance of the process air into the LT stack. In this way the oxygen supply can be increased and at the same time the processed air can be sufficiently cooled. In this case the cooler can be omitted, if desired.

If the system is also provided with a regulator which regulates the electrical power taken from the LT stack, the possibility exists of influencing the operating conditions of the HT stack. Thus, for example, by reducing the electrical power of the LT stack its heat production can be reduced which exercises a cooling effect on the HT stack. Furthermore, by regulating the takeoff of electrical power the water balance of the entire system can be controlled. In other words, if the power takeoff on the LT stack is reduced, its temperature diminishes so that the steam coming from the HT stack can condense out there. The power takeoff thus determines the quantity of liquid water generated in the LT stack which can be recovered at the outlet of the LT stack by means of a condensate separator.

Conversely, the HT stack may also serve as a CO purifier. In this case one assumes that the HT stack operating at temperatures clearly above 100° C. is less sensitive to CO contamination of the fuel than fuel cells of the conventional type with an operating temperature of ca. 60–80° C., i.e. the fuel supplied to the HT stack does not require costly CO purification. By supplying air in the fuel path of the HT stack, the partial oxidation of the CO into carbon dioxide takes place so that the HT stack acts as a CO purification stage for the LT stack.

These and other objects, features and advantages of the present invention will be apparent from the following brief description of the drawing, detailed description of preferred embodiments and appended claims and drawings.

BRIEF DESCRIPTION OF THE DRAWING

The drawing is a schematic representation of a fuel cell system according to the present invention.

DETAILED DESCRIPTION OF THE PREFERRED EMBODIMENTS

The invention is explained below with reference to a schematic representation in the FIGURE.

The fuel cell system consists of an LT stack 1 and a HT stack 2. This preferably involves fuel cells of the membrane type, therefore fuel cells with a polymer membrane which is supplied with hydrogen as a fuel at the anode and oxygen or air oxygen as the oxidizer at the cathode. Typically each stack consists of several cells in order to achieve the necessary total voltage. The two stacks differ only in the operating temperature which, as explained above, is determined essentially by the special type of membrane used. The two stacks are connected in series for process engineering reasons, which means that the fuel (line 20) and the process air (line 22) are initially supplied to the HT stack 2. There the fuel for the process air is partly consumed. The exhaust gases which contain un-burned hydrogen or unoxidized oxygen are supplied to the LT stack 1 through a conduit system 3, 3'.

The two stacks are air cooled, the cooling air initially being fed through the LT stack 1 and the heated air then through HT stack 2. Therefore heat transfer takes place from LT stack 1 to the HT stack 2. This is indicated by the arrows 4 which show the flow direction of the cooling air.

In the connecting line 3,3' a cooler 5 is interposed which cools both the fuel and the process air and brings their temperature to the operating temperature of the LT stack 1 as much as possible. The heat taken off at this time can be utilized, as is customary, for preheating the fuel and the process air on the intake side of the HT stack 2.

On the exhaust gas side of the LT stack 1 in the process air channel, a condensate separator is positioned in order to remove the liquid water present from the exhaust air. The liquid water thus obtained is returned to the system.

The cooling, at least of the process air entering the LT stack 1, can also be accomplished by the admixture of fresh air. For this purpose a mixing valve 7 is connected to the process air conduit 3' with the aid of which fresh ambient air can be metered into the process air path of the LT stack 1.

This system of two fuel cell stacks can now be operated from various aspects. Thus, for example, the LT stack 1 in extreme situations such as in the case of a high ambient temperature may be used as an additional cooler for the HT stack by reducing the takeoff of electrical energy. With this the cooling air on the LT stack 1 is heated up less so that the HT stack 2 can be cooled more strongly. To realize this a regulator 8 is provided in the circuit of the LT stack 1 which is coupled to a temperature sensor 9 on the HT stack. This makes it possible to control the temperature of the HT stack by regulating the electrical power of the LT stack.

In this way the operating temperature of the LT stack can also be adjusted and with it the condensable-out quantity of liquid in the exhaust gas stream from the LT stack can be governed. In this way an otherwise required condenser in the exhaust air stream can be avoided or made smaller. This liquid is required in order to be able to operate a reformer integrated in the system (not shown in FIGURE). By the suitable choice of the energy takeoff, the system can be operated in a water-neutral way, i.e. the water required by the reformer is supplied exclusively by the condensate separator 6.

If the fuel in the vehicle is generated by a reformer, the fuel not only contains hydrogen but also a considerable content of carbon monoxide. From a membrane electrode unit with a high temperature polymer membrane, it is expected that the latter, as opposed to one with a low temperature polymer membrane, will be insensitive to carbon monoxide. By supplying air into the fuel channel 20 using a mixing valve 10 in the HT stack a partial oxidation of CO into carbon dioxide can be caused so that the fuel supplied to the LT stack is reduced in CO.

It is also expected that the membrane of the HT stack 2 can be operated dry rather than wet so that the process air can be supplied relatively dry. The process air is moistened in the HT stack by the water forming there due to the chemical reaction so that the emerging process air has a sufficient degree of moisture for safe operation of the LT stack 1.

However, the advantage of the HT stack, i.e. higher power output, insensitivity to carbon monoxide in the fuel and operation with a relatively dry process air, is offset by the disadvantage that this stack requires a relatively long time until the optimal operating temperature is reached at which the full power can be given off. This time interval is bridged by the power given off by the LT stack 1 which, because of its lower operating temperature, reaches its operating point relatively quickly.

What is claimed is:

1. A fuel cell system comprising two fuel cell stacks with different operating temperatures including a low temperature stack and a high temperature stack, wherein the high temperature stick is positioned in front of the low temperature stack in terms of the process flow of fuel through the fuel cell system.

2. A fuel cell system as in claim 1, wherein the stacks are connected to a common cooling cycle and further comprising a coolant initially flowing through or around the low temperature stack and subsequently the high temperature stack.

3. A fuel cell system as in claim 1 wherein the operating temperature of the low temperature stack is below 100° C., and that of the high temperature stack is more than 100° C.

4. A fuel cell system as set forth in claim 1 wherein the stacks are connected to each other by connecting lines and that a cooler is positioned in said lines.

5. A fuel cell system as set forth in claim 1 further comprising a temperature sensor for measuring the temperature of the high temperature stack and wherein electric power is drawn from the low temperature stack as a function of the temperature of the high temperature stack.

6. A fuel cell system as set forth in claim 1 further comprising a fresh air inlet to the anode inlet of the low temperature stack.

7. A fuel cell system as set forth in claim 6 further comprising a fresh air supply connected to a fuel path of the high temperature stack via a mixing valve to oxidize carbon monoxide present in the fuel into carbon dioxide in the high temperature stack.

8. A fuel cell system as set forth in claim 1 further comprising a condensate separator at a cathode outlet of the low temperature stack.

* * * * *